(12) United States Patent
Sankar et al.

(10) Patent No.: US 9,003,216 B2
(45) Date of Patent: Apr. 7, 2015

(54) POWER REGULATION OF POWER GRID VIA DATACENTER

(75) Inventors: Sriram Sankar, Redmond, WA (US); Christian L. Belady, Mercer Island, WA (US); T. Varugis Kurien, Sammamish, WA (US); Joseph M. Sherman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 516 days.

(21) Appl. No.: 13/251,777

(22) Filed: Oct. 3, 2011

(65) Prior Publication Data

US 2013/0086404 A1 Apr. 4, 2013

(51) Int. Cl.
*G06F 1/00* (2006.01)
*G06F 1/30* (2006.01)
*G06F 1/32* (2006.01)
*G05D 3/12* (2006.01)

(52) U.S. Cl.
CPC .................................. *G06F 1/305* (2013.01)

(58) Field of Classification Search
USPC .................................. 713/324, 320; 700/286
See application file for complete search history.

(56) References Cited

U.S. PATENT DOCUMENTS

| | | | | |
|---|---|---|---|---|
| 7,430,459 | B1 * | 9/2008 | Papalia et al. .................. | 700/286 |
| 8,332,666 | B2 * | 12/2012 | Boss et al. ...................... | 713/300 |
| 8,333,316 | B2 * | 12/2012 | Heath et al. ..................... | 235/375 |
| 8,401,709 | B2 * | 3/2013 | Cherian et al. ................. | 700/291 |
| 8,650,420 | B2 * | 2/2014 | Kato et al. ...................... | 713/320 |
| 2004/0078153 | A1 | 4/2004 | Bartone | |
| 2009/0070611 | A1 | 3/2009 | Bower, III | |
| 2009/0201293 | A1 | 8/2009 | Tung | |
| 2009/0235097 | A1 | 9/2009 | Hamilton | |
| 2010/0332373 | A1 | 12/2010 | Crabtree | |
| 2010/0333105 | A1 | 12/2010 | Horvitz | |
| 2011/0106321 | A1 * | 5/2011 | Cherian et al. ................. | 700/286 |
| 2011/0144818 | A1 | 6/2011 | Li | |
| 2011/0173465 | A1 * | 7/2011 | Akers et al. .................... | 713/310 |
| 2012/0065805 | A1 * | 3/2012 | Montalvo ....................... | 700/297 |

(Continued)

OTHER PUBLICATIONS

Govindan; et al., "Benefits and Limitations of Tapping into Stored Energy for Datacenters"—Published Date: Jun. 2011, Proceedings: ISCA '11 Proceeding of the 38th annual international symposium on Computer architecture, http://www.cse.psu.edu/~sgovinda/papers/isca11.pdf.

"Reducing Data Center Power and Energy Consumption: Saving Money and "Going Green""—Published Date: Jan. 2010, http://www.gtsi.com/cms/documents/white-papers/green-it.pdf.

(Continued)

*Primary Examiner* — Paul R Myers
*Assistant Examiner* — Christopher a Daley
(74) *Attorney, Agent, or Firm* — Brian Haslam; Mike Allen; Micky Minhas (57) ABSTRACT

One or more techniques and/or systems are provided for regulating an amount of power on a power grid using a datacenter. This allows demand to be more closely brought into alignment with supply. For example, when supply exceeds demand by a predetermined level, the datacenter may increase consumption, causing demand to increase, and when demand exceeds supply and/or comes within a predetermined threshold of supply, the datacenter may decrease consumption, causing demand to decrease. In this way, the datacenter can be utilized as a regulatory tool on the grid. It may be appreciated that given the technology used by and/or operations performed by datacenters, datacenters are uniquely situated to achieve these ends as compared to other (large) energy consumers, such as manufacturing facilities that cannot shift around and/or shut-down operations swiftly.

20 Claims, 5 Drawing Sheets

(56) References Cited

U.S. PATENT DOCUMENTS

| | | | |
|---|---|---|---|
| 2012/0323398 A1* | 12/2012 | Boss et al. | 700/297 |
| 2013/0054044 A1* | 2/2013 | Shaffer et al. | 700/297 |
| 2013/0179061 A1* | 7/2013 | Gadh et al. | 701/123 |
| 2013/0274947 A1* | 10/2013 | Miller et al. | 700/297 |

OTHER PUBLICATIONS

Lim; et al., "Power Budgeting for Virtualized Data Centers"—Published Date: Jun. 15, 2011 Proceedings: 2011 USENIX Annual Technical Conference (USENIX ATC '11), http://www.usenix.org/events/atc11/tech/final_files/Lim.pdf.

* cited by examiner

POWER REGULATION OF POWER GRID VIA DATACENTER

BACKGROUND

Today, power is generated from a number of different sources, including renewable and non-renewable resources. Generally speaking, power output by renewable resources varies greatly depending upon weather conditions. For example, power output from solar cells is dependent upon the amount of sunlight, and power output from wind turbines is dependent upon the amount/strength of wind. Therefore, power utility entities often rely on other forms of power generators to supplement the renewable resource generators. For example, the power utility entities may utilize natural gas generators or other generators that can rapidly increase production to generate power when the power output from solar cells and/or wind turbines is insufficient to meet demand.

Moreover, power generators that utilize non-renewable resources, such as coal and/or nuclear power plants, are typically not able to adjust output rapidly in response to changes in demand (e.g., it may take a day or more to ramp up or ramp down production). Therefore, power utility entities forecast the amount of energy that will be demanded and adjust production to meet that forecast. At times when the forecast does not align with actual demand, power utility entities may be forced to take other actions. For example, when demand is greater than supply, power utility entities may utilize power generators (e.g., less efficient peaker type of generators) that can more rapidly increase production (e.g., often at a much higher cost per kWh), and when supply is greater than demand, power utility entities may decrease the cost of power to consumers (e.g., and sometimes even pay consumers) to encourage consumers to utilize more power (e.g., reducing the load on the power grid).

Thus, because electricity demands fluctuate (e.g., hourly and/or daily), it is difficult for power utility entities to match supply with demand. When supply is insufficient to meet demand, power utility entities may utilize plants that are able to ramp up production rapidly to increase supply (e.g., which are often more expensive to operate and/or are inefficient). When supply is greater than depend, power utility entities provide incentives to consumers to increase power consumption until supply is substantially aligned with demand.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for regulating the amount of power on a power grid via a datacenter(s) (e.g., a server farm) are provided. A communication channel is established between power utility entity(s) and the datacenter(s) through which information/data can be transmitted. For example, the power utility entity may provide the datacenter with information indicative of power consumption on the power grid (e.g., information indicative of power supply and demand). Based at least in part upon such information, the datacenter may be configured to adjust an amount of power consumed by the datacenter. That is, the datacenter can throttle up and/or throttle down power consumption based at least in part upon the information provided by the power utility entity. For example, when there is an excess supply on the power grid (e.g., when supply is greater than demand by a specified threshold), the datacenter may be configured to increase power consumption to bring demand closer to supply (e.g. reducing excess supply). Conversely, when there is a short supply of power, the datacenter may be configured to reduce power consumption (e.g., and/or go off the grid) until demand is more closely aligned with supply.

It will be appreciated that there are numerous ways that a datacenter can throttle up or throttle down power consumption. For example, one or more processes can be turned off, turned on, and/or transferred to another datacenter (e.g., where there is an excess demand of power on the power grid turn off processes and/or transfer processes to another data center) to adjust the amount of power being consumed by one or more servers of the datacenter. Moreover, when there is excess supply, power consumption code can be executed in a virtualized environment on one or more servers to increase consumption (e.g., execution of the code would increase the consumption of energy). It will be appreciated that these techniques and/or other techniques described throughout the disclosure are merely example techniques and are not intended to be interpreted in a limiting manner.

Regulating the amount of power on a power grid via a datacenter(s) has numerous advantages. For example, in exchange for regulating power, the datacenter may be able to negotiate energy rates that are different than (e.g., lower than) market rates and/or take advantage of periods when power utility entities pay consumers to use energy (e.g., reducing overall energy costs of the datacenter). Moreover, power supply on a power grid may be more stable (e.g., reducing the need for costly peak generators and/or reducing an excess supply of power on the grid). Also, tempering peaks in demand on the grid allows a buffer for the grid to be reduced (e.g., normal operation or utilization of the grid may be held closer to the maximum capacity for the grid, because the peaks have been tempered).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Traditionally, datacenters have been relatively large, but substantially constant, loads on a power grid. That is, datacenters typically consume a large amount of power (e.g., relative to most other consumers on the grid) because of the amount of energy utilized to power servers and/or to cool the servers. However, datacenters are typically still small enough that they do not substantially impact market movements (e.g., they typically do not, by themselves, cause a significant spike or drop in demand).

Among other things, one or more systems and/or techniques for regulating the amount of power on a power grid via a datacenter(s) (e.g., a server farm) are provided. A communication channel may be established between a power utility entity(ies) and the datacenter(s) through which information/data can be transmitted. For example, the power utility entity may provide the datacenter with information indicative of power consumption on the power grid (e.g., information indicative of power supply and demand). Based at least in part upon such information, the datacenter may be configured to adjust an amount of power consumed by the datacenter. It will be appreciated that the term datacenter is used herein in a broad sense to describe one or more structures that comprises servers or other devices for processing data. Such structures could be spread out over a vast geographic area (e.g., such as a campus environment, and/or across different areas serviced by the grid, etc.) and/or the servers may be comprised in merely a single structure.

Stated differently, one or more systems and/or techniques are provided for utilizing a datacenter to smooth a supply of electricity on a power grid such that the supply of electricity substantially matches the demand for electricity (e.g., within an desired/specified range). In this way, power supply may be at least partially regulated by a datacenter as opposed to a power utility entity that may have higher cost associated with regulating power supply. Moreover, because the burden of regulating power supply may be at least partially transferred to the datacenter, the datacenter may establish an energy rate(s) that is more favorable to the datacenter relative to market rates, for example.

It will be appreciated that, given the technology involved, the operations performed, etc. by datacenters, datacenters are in a unique position for regulating power relative to other power consumers (e.g., particularly large power consumers that may be able to effect changes in supply by increasing/decreasing demand). For example, a datacenter may be able to adjust power consumption from 100 kW to 100 MW in a matter of minutes based at least in part upon information regarding power consumption on the power grid, whereas other power consumers (e.g., such as automobile manufacturing plants, steel manufacturing plants, etc.) may not be able to adjust power consumption to a similar degree (e.g., and/or may be able to do so merely at a cost that makes such changes undesirable) and/or adjust power consumption as quickly as a datacenter.

Figure 1:
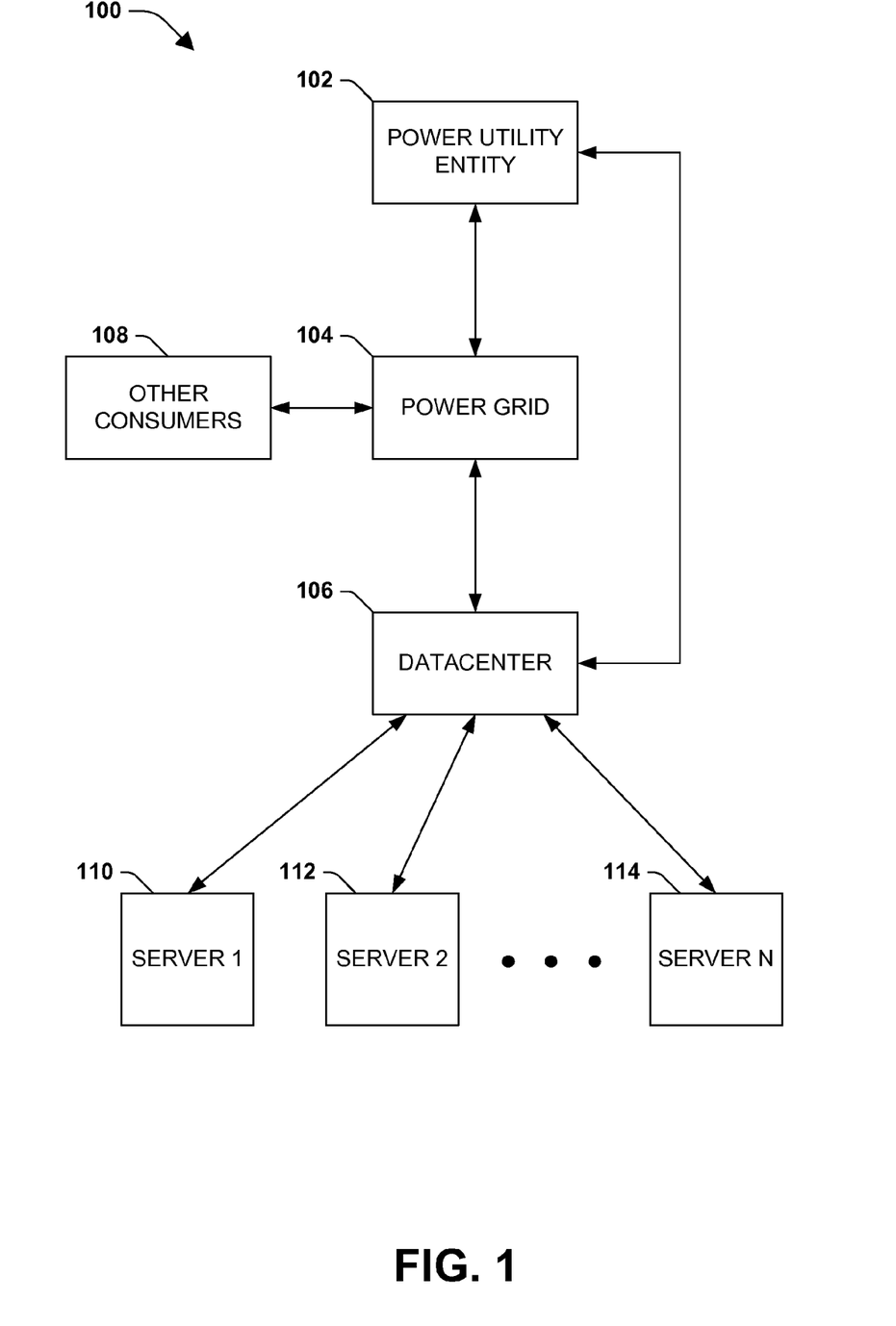
FIG. 1 is an exemplary system for regulating power on a power grid via a datacenter.

FIG. 1 provides an example power regulation system 100 for regulating an amount of power on a power grid 104 via a datacenter 106. That is, FIG. 1 illustrates a datacenter 106 configured to adjust power consumption based at least in part upon power consumption information provided to the datacenter 106 from a power utility entity 102 (e.g., responsible for managing power on the power grid 104). In this way, the datacenter 106 can throttle up (e.g., increase) power consumption when the power grid 104 has an excess supply of power (e.g., supply exceeds demand by a predetermined threshold) and/or throttle down (e.g., decrease) power consumption when the power grid 104 has a short supply of power (e.g., demand exceeds supply and/or supply exceeds demand by less than a predetermined threshold (e.g., a cushion)).

It will be appreciated that the example power regulation system 100 may replace and/or be used in conjunction with traditional power regulation techniques. For example, when there is an increased demand for power (e.g., above what is forecasted and therefore can be produced by low cost energy generators (e.g., such as coal and/or nuclear plants)), the datacenter 106 may be configured to reduce power consumption to drop demand. However, if the datacenter 106 is unable to reduce demand sufficiently to meet supply, one or more peak generators (e.g., power generators that can rapidly ramp up or down power output) may be utilized to provide more power to the power grid 104.

The example power regulation system 100 comprises the power utility entity 102 and the datacenter 106. The power utility entity 102 (e.g., which may be a power generator and/or merely an entity that monitors an amount of power on the power grid 104) is configured to generate information indicative of power consumption on the power grid 104. Generally speaking, the generated information is configured to provide the datacenter 106 with enough information to determine whether to increase or decrease power consumption. For example, in one embodiment, the generated information may be indicative of real-time (e.g., present) information regarding power supplied to the power grid 104 and/or power demands by other consumers 108 and/or may be indicative of forecasting information related to future supply and/or demand on the power grid 104. In another embodiment, the generated information may be indicative of an amount of change the power utility entity desires the datacenter 106 to make in its power consumption. For example, the generated information may comprise a request for the datacenter 106 to increase power consumption by 10 MW.

It will be appreciated that the phrase "information indicative of power consumption on a power grid" is intended to be interpreted in a broad sense to include information such as specified in the aforementioned examples and/or other types of information that could be provided to a datacenter 106 to provide guidance to the datacenter 106 on whether to increase and/or decrease power consumption (e.g., to regulate an amount of power on the power grid 104). Thus, the generated information may or may not comprise actual power consumption readouts (e.g., how much power is available on the power grid 104 and/or how much power is being consumed by other consumers 108), but rather may, in some embodiments, indicate to the datacenter 106 a desired change in power consumption by the datacenter 106, for example.

The datacenter 106 is configured to receive the generated information from the power utility entity 102. For example, the datacenter 106 may be configured to receive the information indicative of the present supply and present demand of power on the power grid 104 and/or forecasted future supply and demand of power on the power grid 104. Based at least in part upon such information, the datacenter 106 may be configured to calculate how much power the datacenter 106 should consume from the power grid 104 (e.g., to bring the supply within a specified range of demand). Alternatively, the generated information may be indicative of how much power the datacenter 106 should consume, so the datacenter 106 may not have to make such a calculation.

The datacenter 106 is also configured to adjust the amount of power consumed by the datacenter 106 from the power grid 104 based at least in part upon the received information from the power utility entity 102. Stated differently, in response to the information received from the power utility entity 102, the datacenter 106 may throttle up and/or throttle down power consumption to increase the demand for power from the power grid 104 (e.g., when there is an excess supply of power) and/or to decrease demand for power from the power grid 104 (e.g., when there is a short supply of power).

Figure 2:
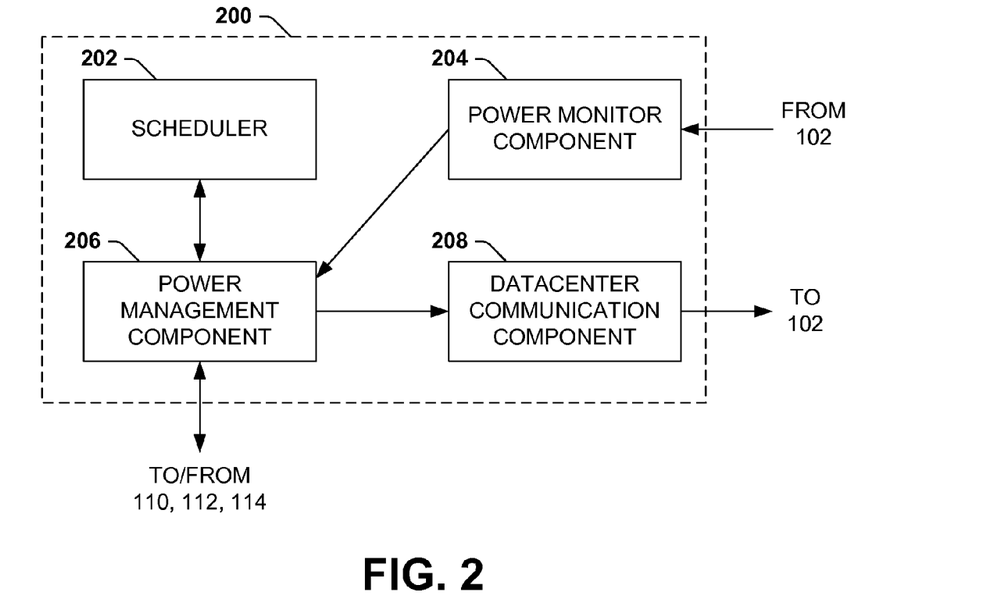
FIG. 2 is an exemplary system illustrating example components of a datacenter configured to regulate power on a power grid.

It will be appreciated that there are numerous techniques for adjusting power consumption by a datacenter, some of which are described in more detail with respect to FIG. 2. However, generally speaking, such an adjustment in power consumption generally utilizes the capabilities of one or more servers 110, 112, and/or 114, etc. of the datacenter 106. For example, the datacenter 106 may reduce power consumption by decreasing (e.g., to zero) the workload of one or more of the servers 110, 112, 114 and/or may increase power consumption by increasing the workload of one or more of the servers 110, 112, and 114. Other techniques for adjusting the amount of power consumed by the datacenter 106 from the power grid 104 (e.g., which may not involve adjusting the workload of one or more of the servers 110, 112, and/or 114) include, among other things, utilizing a power generator(s) at the datacenter 106 to supplement power supplied to the datacenter 106 via the power grid 104 and/or adjusting power supplied to non-critical portions of the datacenter 106 (e.g., turning off lights and/or cooling apparatuses in areas of the datacenter 106 where such features are not required).

While the minimum and maximum amount of power that is capable of being consumed by a datacenter 106 may depend upon numerous factors (e.g., such as the size of the datacenter 106, the functions of the datacenter 106, and/or amount of redundancy between the datacenter 106 and other datacenters), generally speaking, the datacenter 106 can be configured adjust power consumption by about 100 MW or more in one embodiment. For example, the datacenter 106 may be able to operate at power levels in the range of 100 kW and 100 MW. Thus, the datacenter 106 may be able to influence (e.g. to a more significant degree than other power consumers 108) demand for power from the power grid 104 (e.g., to bring demand within a reasonable level of supply). Moreover, because the datacenter 106 is typically configured to adjust power consumption by adjusting the loads on one or more of the servers 110, 112, 114 (e.g., which can occur quickly), it will be appreciated that adjustments in power consumption can be performed relatively quickly (e.g., in real-time as supply and/or demand on the power grid 104 changes). For example, in a matter of minutes, the datacenter 106 may be able to adjust power consumption from 100 kW to 100 MW and/or vice-versa, for example.

FIG. 2 illustrates example components of a datacenter 200 (e.g., 106 in FIG. 1) that may be configured to adjust an amount of power consumed by the datacenter 200 from a power grid (e.g., 104 in FIG. 1). In this way, the datacenter may regulate a demand for power. For example, when there is a low supply of power on the power grid, the datacenter 200 may be configured to reduce power consumption from the power grid to decrease demand (e.g., until demand is within a specified range of supply) and/or when there is an excess supply of power on the power grid, the datacenter 200 may be configured to increase power consumption from the power grid to increase demand (e.g., bringing demand within the specified range of supply) (e.g., and using excess supply).

The example datacenter 200 comprises a power monitor component 204 configured to receive information from a power utility entity (e.g., 102 in FIG. 1) indicative of power consumption and/or availability on the power grid. For example, in one embodiment, the power monitor component 204 may be configured to receive information indicative of a present supply and/or a present demand on the power grid. Based at least in part upon such information, the datacenter may be configured to calculate how much power the datacenter 106 should consume from the power grid 104 (e.g., to bring the supply within a specified range of demand). In yet another embodiment, the power monitor component 204 may receive information indicative of future supply and/or forecasted, future demand for power from the power grid, and the power monitor component 204 may perform a similar calculation based at least in part upon the information regarding future power consumption. Alternatively, the power monitor component 204 may receive information indicative of how much power the datacenter 200 should consume, so the power monitor component 204 may not have to perform calculations regarding power consumption, for example.

The calculated and/or received information may be transmitted from the power monitor component 204 to a power management component 206 configured to control power consumption by the datacenter 200 (e.g. including power consumption by one or more servers 110, 112, 114 in FIG. 1, for example). In one embodiment, the power management component 206 may also be configured to monitor an amount of power consumed by the datacenter and/or monitor an amount of power supplied to the datacenter from the power grid. Based at least in part upon the information transmitted to the power management component 206 from the power monitor component 204 and/or based at least in part upon current power consumption of the datacenter 200, the power management component 206 may be configured to adjust an amount of power consumed by the datacenter 200 and/or an amount of power supplied by the power grid to the datacenter 200.

It will be appreciated that there are numerous ways to control power consumption by a datacenter and/or to control an amount of power that the datacenter consumes from a power grid. Thus, there are numerous ways the power management component 206 may control power consumption of power supplied from the power grid. For example, in one embodiment, the power management component 206 may be configured to power up and/or power down generators (e.g., natural gas generators, diesel generators, etc.) at the datacenter 200 that are configured to supplement and/or replace power supplied by the power grid. By way of example, when the demand for power increases to within a specified threshold of supply and/or exceeds supply (e.g. as indicated in the information supplied to the power management component 206 from the power monitor component 204), the power management component 206 may be configured to increase (indigenous) power production by generators at the datacenter 200 (e.g., to take the datacenter 200 off the grid and/or reduce an amount of power pulled from the grid by the datacenter 200). Once demand drops and/or supply increases, the power management component 206 may be configured to decrease power production by the generators at the datacenter 200 to increase an amount of power consumed by the datacenter 200 from the power grid.

The power management component 206 may also be configured to adjust power consumption utilizing one or more servers (e.g., 110, 112, 114 in FIG. 1) of the datacenter 200. By way of example, in one embodiment, the power management component 206 is configured to adjust power consumption of the datacenter 200 by adjusting a workload of one or more servers. For example, if power consumption is to be adjusted downward, the power management component 206 may request that one or more servers turn off processes that the power management component 206 deems to be of low priority (e.g., non-critical task) and/or may request that one or more processes (e.g., loads) be transferred from a server(s) in the datacenter 200 to a server(s) in another datacenter (e.g., located in a region where there is excess power on the power grid). Conversely, if power consumption is to be adjusted upward, the power management component 206 may request that one or more servers turn on additional processes (e.g., causing the one or more servers to consume additional power) and/or may request a transference of processes from one or more servers located in another datacenter to one or more servers in the datacenter 200. Moreover where one or more servers (e.g., portions of the datacenter 200) merely perform non-critical tasks (e.g., routine updates, diagnostics, backups, etc.), for example, the power management component may be configured to power on and/or power off those portions of the datacenter 200 to adjust power consumption by the datacenter.

As yet another example, one or more of the servers may be configured to host a virtualized environment, and the virtualized environment may be configured to execute power consumption code. For example, when the power monitor component 204 indicates to increase power consumption, the power management component 206 may be configured to issue a request to one or more servers configured to host virtualized environments to start the virtualized environments and/or execute the power consumption code. Such code may be configured to increase processor tasks and/or spin storage devices to convert electricity into heat energy, for example. When the power monitor component 204 indicates to decrease power consumption, the power management component 206 may issue another request to turn off the virtualized environments and/or stop executing the power consumption code. It will be appreciated that the aforementioned techniques for adjusting power consumption by the datacenter are merely example techniques and are not intended to be interpreted in a limiting manner. That is, other techniques besides those described herein for adjusting power consumption by the power management component 206 are also contemplated herein.

In the illustrated embodiment, the example datacenter 200 further comprises a scheduler 202. The scheduler 202 is configured to identify processing jobs (e.g., non-critical tasks) and to schedule one of more of processing jobs to be performed by the datacenter when the received information is indicative of an excess supply of power on the grid. In one example, using a schedule(s) developed by the scheduler 202, the power management component 206 may be configured to adjust power consumption by the datacenter 200. By way of example, the scheduler 202 may be configured to arrange processing jobs according to a degree of power increase. When power consumption is to be increased by 100 kW, the power management component 206 may issue a request to one or more servers to execute a first set of processes (e.g., as dictated by a first schedule generated by the scheduler 202), and when power consumption is to be increased by 30 MW, the power management component 206 may be configured to issue a request that one or more servers execute a second set of processes (e.g., also dictated by a second schedule generated by the scheduler 202). Thus, the scheduler 202 may generate one or more schedules indicative of which processing jobs may be performed at different power consumption levels/ranges, and the power management component 206 may utilize the one or more schedules when determining how to increase and/or decrease power consumption, for example.

As another example, the scheduler 202 may be configured to determine power consumption by one or more processes and/or one or more servers prior to receiving a request to increase or decrease power consumption from the power grid (e.g., creating a benchmark(s) for power consumption). For example, in one embodiment, it may be determined that the average process consumes 5 kW of power and/or that the average server (e.g., or rack of servers) consume 30 kW of power. Based upon such a determination, the power management component 206 may determine the number of processes and/or servers that could be utilized (e.g., turned on or turned off or up or down, etc.) to achieve a desired increase or reduction in power consumption. As an example, if power consumption from the power grid is to be reduced by 300 kW and the average process consumes 5 kW, the power management component 206 may determine that 60 processes are required to be turned off and may proceed with shutting down processes according to some predetermined criteria (e.g., in order from least critical to most critical). Once such processes have been shut down, the power management component 206 (e.g., and/or the power monitor component 204) may verify that power consumption by the datacenter from the power grid has been reduced as specified, for example. If, during the verification, it is determined that power consumption needs to be further adjusted (e.g., too many processes were turned off and/or too few processes were turned off), the power management component 206 may proceed with further adjusting the number of processes and/or servers operating accordingly. It will be appreciated that the numbers listed herein are merely intended to be examples and do not necessarily reflect actual figures that may be achieved in practical implementations. For example, in practical implementations respective processes may merely draw 1 kW or less of power.

The example datacenter 200 further comprises a datacenter communication component 208 configured to provide the power utility entity with information related to power consumption by the datacenter 200. For example, the datacenter communication component 208 may be configured to receive information from the power management component 206 indicative of current power consumption levels and/or indicative of current throttling capacity (e.g., indicative of a maximum and/or a minimum amount of power that can be consumed by the datacenter 200 at a given time). For example, the throttling capacity of the datacenter 200 may fluctuate from time to time (e.g., non-critical task may become critical and/or load may be shifted to the datacenter from another datacenter because of scheduled maintenance at the other datacenter, etc.), and such information may be provided to the power utility entity via the datacenter communication component 208 (e.g., so that the power utility entity has knowledge regarding the extent to which the datacenter 200 can bring demand into alignment with supply). In another embodiment, the datacenter communication component 208 may be configured to provide the power utility entity with information regarding expected future demand of the datacenter 200. For example, if the datacenter 200 has been operating for a period of time at a low power level (e.g., to reduce demand on the power grid because of high demand from other power consumers), the datacenter 200 may provide the power utility entity with a notice providing that the datacenter 200 may increase power consumption within a day to perform processes that have been on hold (e.g., such as reporting processes) while the datacenter 200 has been operating at the low power level.

It will be appreciated that by receiving power consumption information from the power utility entity (e.g., indicative of power supply and/or demand on the power grid) and/or providing to the power utility entity information regarding power consumption by the datacenter 200, a feedback loop may be created whereby the power utility entity and the datacenter 200 may work cooperatively to regulate the amount of power on the power grid (e.g., to regulate supply and demand such that supply substantially matches demand (e.g., within a specified tolerance)). It will be appreciated that such cooperation may be mutually beneficial. For example, the datacenter 200 may benefit by negotiating rates with the power utility entity that are different than (e.g., reduced from) market rates and/or by taking advantage of instances where excess supply causes the power utility entity to provide incentives to entities that can increase power consumption (e.g. such as negative pricing, where the power utility entity pays an entity to consume power). The power utility entity may benefit because the datacenter 200 may regulate demand (e.g., to better align with supply), so that the amount of power on the power grid is substantially constant (e.g., to promote a consistent energy rate). Moreover, the power utility entity may utilize the datacenter 200 to control demand rather than and/or to supplement the use of peak generators (e.g., which may be costly to run and/or inefficient) to control supply.

Moreover, it will be appreciated that in one embodiment, the communications between the power utility entity and the datacenter 200 may be at least partially and/or fully automatic. By way of example, the power utility entity may identify a build-up in supply and/or a drop in supply and automatically notify the datacenter 200 to increase or decrease supply accordingly. Further, in one embodiment, the adjustment of power consumption from the power grid by the datacenter 200 may be performed automatically (e.g., with or without human intervention). For example, if the power utility entity forwards a request to reduce power consumption by 300 kW, the power management component 206 may determine how the datacenter 200 can reduce consumption by 300 kW and proceed to automatically perform necessary actions to achieve such reductions.

Figure 3:
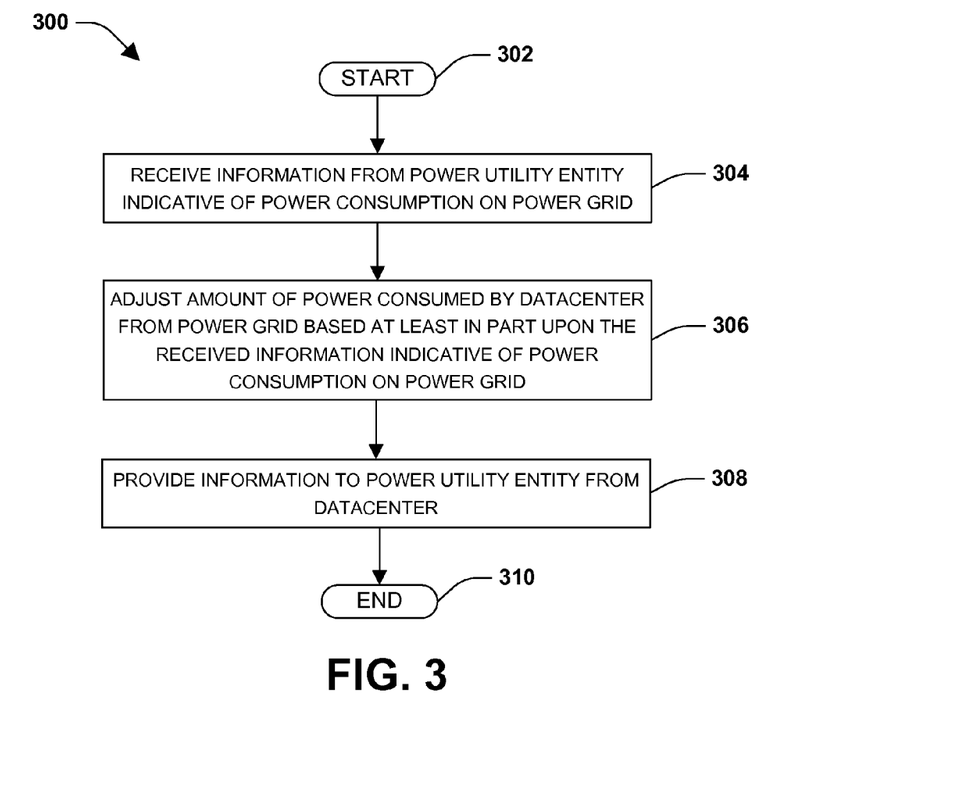
FIG. 3 is an exemplary method for regulating power on a power grid.

FIG. 3 illustrates an example method 300 for regulating power on a grid via a datacenter. That is, the example method 300 provides for adjusting power demand on the power grid using a datacenter (e.g., which may be configured to operate on as little power as 100 kW and/or as much power as 100 MW, for example) based at least in part upon power consumption information indicative of overall power consumption on the power grid (e.g., information regarding current (e.g., present) power supply and/or demand). In this way, an amount of power on a grid may be regulated by a datacenter (e.g., which adjusts demand) as opposed to and/or in conjunction with a power utility entity (e.g., which may adjust supply using one or more peak generators).

The example method 300 beings at 302 and information is received from the power utility entity indicative of power consumption on the power grid at 304. For example, the received information may be representative of a current supply of power on the power grid and/or representative of a current demand of power from the power grid. In another embodiment, the received information may comprise a request for the datacenter to adjust an amount of power it consumes from the power grid. For example, the received information may comprise a request from the datacenter to increase power consumption and/or decrease power consumption by 10 MW. It will be appreciated that the received information may also and/or instead be indicative of a forecasted (e.g., predicted) future demand and/or supply from power from the power grid. In this way, the datacenter may plan accordingly with respect to power consumption (e.g., plan to increase processes and/or decrease process based at least in part upon future predictions), for example.

At 306 in the example method 300, an amount of power consumed by the datacenter from the power grid may be adjusted based at least in part upon received information indicative of power consumption on the power grid. That is, stated differently, the datacenter may be configured to adjust an amount of power it acquires from the grid based at least in part upon the received information. In this way, the datacenter may regulate the demand for power from the power supply. By way of example, when the received information indicates that supply exceeds demand by a predetermined threshold, the datacenter may be configured to increase the amount of power consumed by the datacenter from the power grid to increase demand (e.g., bringing demand closer to supply). Conversely, when the received information indicates that demand exceeds supply and/or that demand is edging too close to supply (e.g., such that little to no reserve remains on the power grid), the datacenter may be configured to decrease the amount of power consumed by the datacenter from the power grid to decrease demand (e.g., causing demand to decrease below supply by a predetermined threshold). In this way, the power available on the power grid may substantially parallel demand (e.g., to reduce energy rate spikes caused by excess demand and/or energy rate drops caused by excess supply).

It will be appreciated that there are numerous ways to adjust the amount of power consumed by the datacenter from the power grid. For example, in one embodiment, the datacenter may comprise one or more (back-up) generators that may be throttled up to reduce the demand of the datacenter on the power grid and/or may be throttled down to increase demand of the datacenter on the power grid. Such a technique may find particular applicability in situations where power consumption to servers cannot be reduced to a level that causes the datacenter to drop power demand on the grid to a satisfactory level and/or in situations where it may be undesirable to reduce overall power consumption by the datacenter, for example. In another embodiment, the datacenter may adjust the amount of power consumed by adjusting power distribution within the datacenter. By way of example, the datacenter may comprise one or more portions that can be powered down or powered up to decrease or increase power consumption, respectively. For example, in one embodiment, the datacenter may increase power supplied to cooling units for one or more portions of the datacenter to increase power consumption (e.g., causing the one or more portions of the datacenter to drop in temperature by 1-2 degrees) and/or may decrease power supplied to cooling units for one or more portions of the datacenter to decrease power consumption (e.g., causing the one or more portions of the datacenter to increase in temperature by 1-2 degrees). Thus, the amount of power consumed by the datacenter may be adjusted by adjusting an amount of power generated by the datacenter and/or by adjusting power supplied to components that are merely indirectly related to the functions of the datacenter (e.g., processing data), such as adjusting power supplied to lighting units and/or to cooling units).

As described with respect to FIGS. 1-2, the amount of power consumed by the datacenter from the power grid may also and/or instead be adjusted by adjusting the amount of power consumed by one or more servers of the datacenter. For example, the workload of one or more servers may be increased and/or decreased to adjust power consumption. As an example, non-critical and/or low priority tasks and/or processes may be stopped to reduce power consumption and/or may be started to increase power consumption. As yet another example, the workload of one or more servers of the datacenter (e.g., and thus workload of the datacenter) may be transferred to one or more servers of a second datacenter (e.g., in a different geographic region than the datacenter) (e.g., using workload/application prioritization techniques) to decrease power consumption of the one or more servers in the datacenter, and/or the workload of one or more servers at the second datacenter may be transferred to one or more servers in the datacenter to increase power consumption of the one or more servers in the datacenter.

In another embodiment, power consumption by one or more servers (e.g., and thus the datacenter) may be adjusted utilizing one or more virtual environments hosted on one or more servers. For example, one or more virtual environments may be configured to execute power consumption code (e.g., configured to increase processing and/or spin storage devices) when it is desirable to increase power consumption by one or more servers of the datacenter based at least in part upon the received information. In this way, code executed that is configured to cause electrical energy to be converted into heat energy (e.g., with few to no processing benefits). Conversely, when it is desirable to decrease power consumption based at least in part upon the received information, the one or more servers may be configured to stop the execution of power consumption code (e.g., and shutdown the virtual environment(s)).

In yet another embodiment, one or more processing jobs may be scheduled to be performed by the datacenter and/or servers thereof based at least in part upon the amount of power that is to be consumed. By way of example, critical task and/or processes of the datacenter may be scheduled to be performed regardless of the desired power consumption level and/or range (e.g., unless the datacenter is to be completely shutdown), a first set of non-critical tasks and/or processes may be scheduled to be performed when the desired power consumption level exceeds a first level (e.g., 300 kW), a second set of non-critical tasks and/or processes may be scheduled to be performed when the desired power consumption level exceeds a second level (e.g., 1 MW), etc. That is, stated differently, it may be determined how much power one or more processes and/or one or more servers consume (e.g., to develop benchmarks), and based upon such information, different scenarios may be developed that specify which processes and/or which servers are to be operational at different power consumption levels. Thus, one or more schedules may be devised for indicating which processes to execute (or not) when power consumption is desired to be at a given level, for example.

It will be appreciated that based at least in part upon these schedules the amount of power may be increased and/or decreased. For example, when is it desirable to increase consumption to 1 MW, the second set of non-critical tasks and/or processes (e.g., which may also include the critical tasks/processes and/or the first set of non-critical tasks/processes) may be performed, and when it is desired to decrease consumption to 400 kW, merely the first set of non-critical tasks and/or processes (e.g., which may also include the critical tasks/processes) may be performed.

At 308 in the example method 300, information is provided to the power utility entity from the datacenter. Such information may be indicative current power consumption by the datacenter (e.g., and/or current power consumption from the power grid by the datacenter) and/or current throttling capacity of the datacenter (e.g. indicative of a minimum and/or a maximum amount of power that can be presently consumed by the datacenter), given the critical loads of the datacenter and/or the present ability to stop and/or transfer workloads to a different datacenter, for example. That is, throttling capacity may change over the course of a day, week, etc., and such information may be provided to the power utility entity to better determine whether to increase and/or decrease supply (e.g., utilizing peak generators).

In another embodiment, the provided information may be indicative of future power demands of the datacenter and/or future throttling capacity. For example, status reports related to the health of one or more servers of the datacenter may not have been generated within the past 6 days, so such status reports may be required to be generated within the next 2 days. As such, the datacenter may report to the power utility entity that the datacenter will increase power consumption from the grid in the next day (e.g., allowing the power utility entity to ramp up production of power via lower cost generators that take longer ramp up). As another example, the datacenter may have scheduled maintenance that is to begin in a couple days, and the datacenter may report a reduction in throttling capacity to the power utility entity (e.g., because one or more servers will be powered down and thus unable to increase power consumption). In this way, the power utility entity may be provided information that can be utilized by the power utility entity to better forecast necessary supply and/or to prepare itself for the responsibility of (self)adjusting supply (e.g., as opposed to the datacenter adjusting demand).

The example method 300 ends at 310.

It will be appreciated that the example method 300 is merely intended to provide an example technique for regulating power on a power grid via a datacenter and is not intended by be construed in a limiting manner. Moreover, the order of the acts described in the example method 300 is merely intended to be an example order. For example, information may be provided to the power utility entity before and/or after information is received from the power utility entity.

Figure 4:
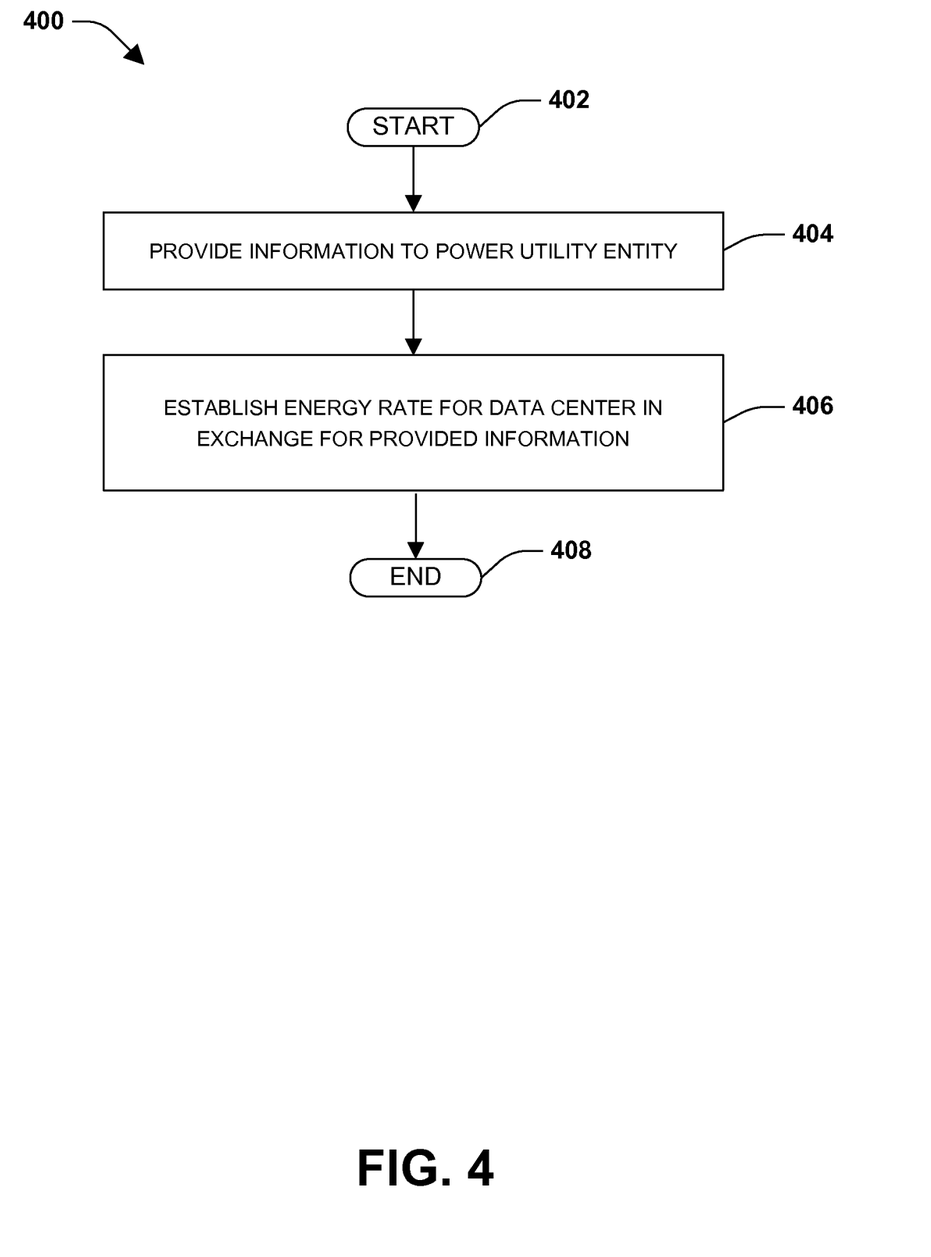
FIG. 4 is an exemplary method for establishing an energy rate for a datacenter.

It will be appreciated that because at least some of the burden of regulating power on the power grid is transferred from a power utility entity to a datacenter, an energy rate may be established for the datacenter that is different than market rates (e.g., and more favorable to the datacenter). FIG. 4 illustrates an example method 400 for establishing an energy rate(s) for the datacenter.

The example method 400 begins at 402, and information is provided to the power utility entity to help the power utility entity regulate power on the grid at 404. For example, in one embodiment, information indicative of throttling capacity of the data center may be provided to the power utility entity. That is, the datacenter may specify a minimum and/or a maximum amount of power that it can consume and/or that it is willing to consume to regulate the amount of power on the power grid (e.g., to maintain demand within a predetermined level of supply). It will be appreciated that other information can be provided to the power utility entity as well and/or instead of throttling capacity. For example, current power demand of the datacenter and/or forecasted, future power demand of the datacenter can be provided to the power utility entity. In this way, the power utility entity can better assess whether to increase and/or decrease supply, for example.

At 406 in the example method 400, in exchange for the provided information, an energy rate is established for the datacenter. Such an energy rate may be a fixed sum (e.g., 12 cents per kWh) and/or may be a discount over current market rates (e.g., 15% off current market rates, which may fluctuate daily). Typically, the established energy rate is less than market rates because the datacenter is agreeing to assist the power utility entity with regulating the amount of power on the power grid, including consuming excess power that the datacenter may otherwise not consume, for example. However, the energy rate may be greater than current market rates. For example, the energy rate may be greater than current market rates in exchange for an agreement to lock in the rates for a specified time period (e.g., number of years).

At 408, the example method 400 ends.

It will be appreciated that if the power utility entity is unable and/or unwilling to establish an energy rate that is desirable to the datacenter (e.g., using the example method 400 of FIG. 4), the datacenter may still obtain lower energy rates using the techniques and/or systems described herein. For example, the datacenter may increase power consumption when energy rates are favorable (e.g., when there is an excess supply of power on the power grid) and/or when there is negative pricing (e.g., a power utility entity is paying one or more power consumers to increase consumption), and may decrease power consumption when energy rates are unfavorable (e.g., when there is excess demand for power from the power grid).

Figure 5:
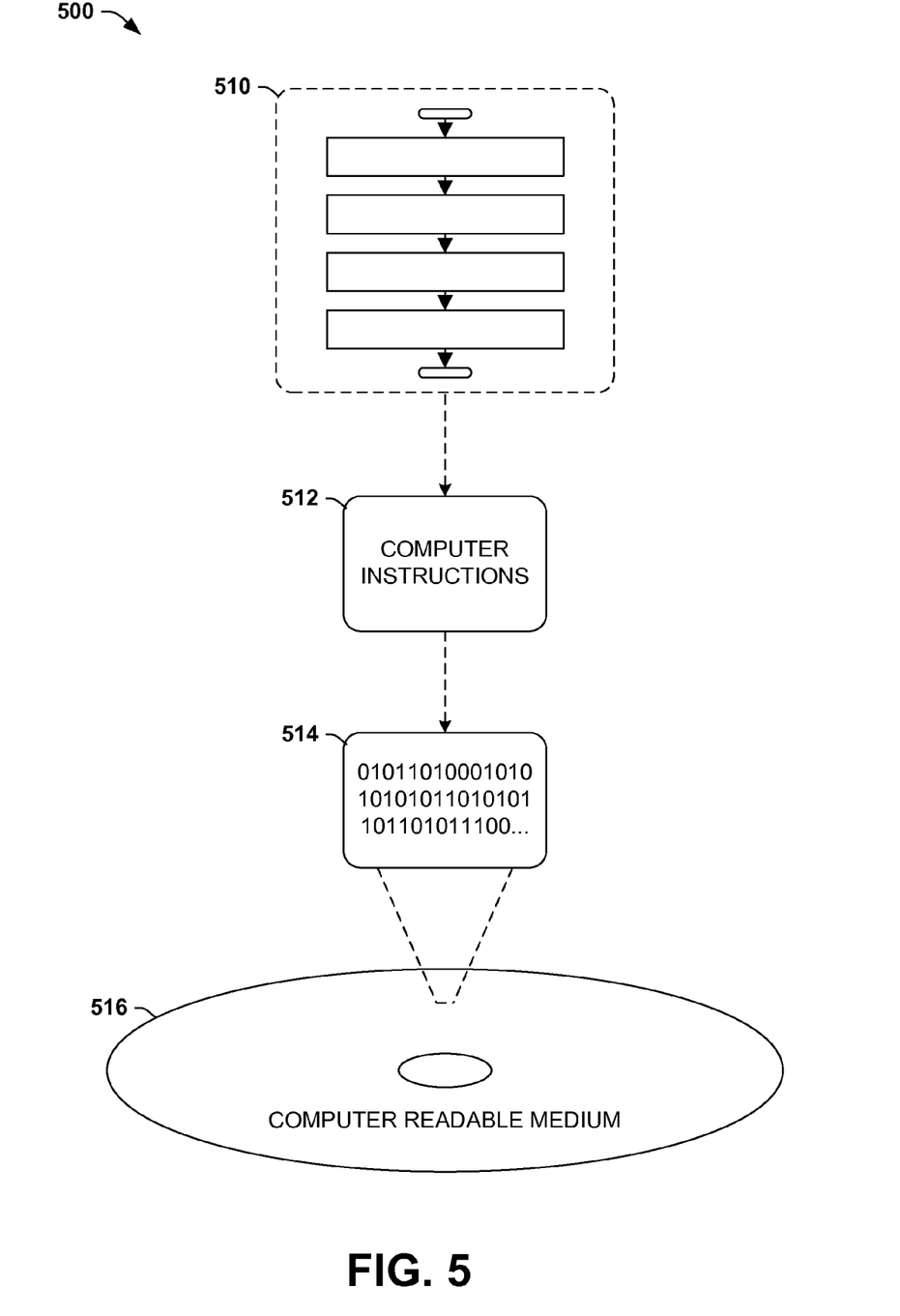
FIG. 5 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 516 (e.g., a CD-R, DVD-R, or a platter of a hard disk drive), on which is encoded computer-readable data 514. This computer-readable data 514 in turn comprises a set of computer instructions 512 configured to operate according to one or more of the principles set forth herein. In one such embodiment 500, the processor-executable computer instructions 512 may be configured to perform a method 510, such as at least some of the exemplary method 300 of FIG. 3 and/or 400 of FIG. 4, for example. In another such embodiment, the processor-executable instructions 512 may be configured to implement a system, such as at least some of the exemplary system 100 of FIG. 1 and/or 200 of FIG. 2, for example. Many such computer-readable media 516 may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
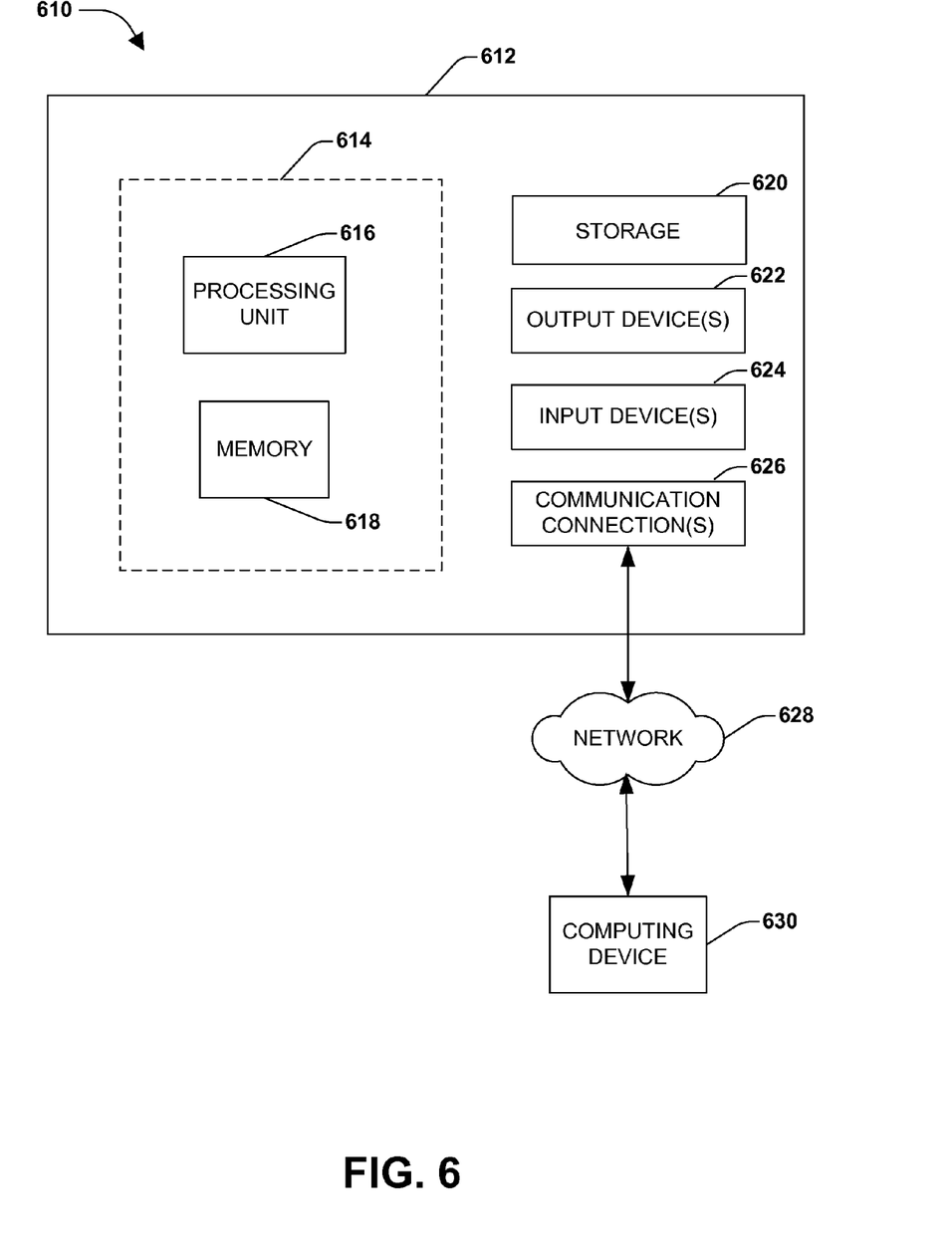
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 610 comprising a computing device 612 configured to implement one or more embodiments provided herein. In one configuration, computing device 612 includes at least one processing unit 616 and memory 618. Depending on the exact configuration and type of computing device, memory 618 may be volatile (such as RAM, for example), non-volatile (such as ROM, flash memory, etc., for example), or some combination of the two. This configuration is illustrated in FIG. 6 by dashed line 614.

In other embodiments, device 612 may include additional features and/or functionality. For example, device 612 may also include additional storage (e.g., removable and/or non-removable) including, but not limited to, magnetic storage, optical storage, and the like. Such additional storage is illustrated in FIG. 6 by storage 620. In one embodiment, computer readable instructions to implement one or more embodiments provided herein may be in storage 620. Storage 620 may also store other computer readable instructions to implement an operating system, an application program, and the like. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 612. Any such computer storage media may be part of device 612.

Device 612 may also include communication connection(s) 626 that allows device 612 to communicate with other devices. Communication connection(s) 626 may include, but is not limited to, a modem, a Network Interface Card (NIC), an integrated network interface, a radio frequency transmitter/receiver, an infrared port, a USB connection, or other interfaces for connecting computing device 612 to other computing devices. Communication connection(s) 626 may include a wired connection or a wireless connection. Communication connection(s) 626 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 612 may include input device(s) 624 such as keyboard, mouse, pen, voice input device, touch input device, infrared cameras, video input devices, and/or any other input device. Output device(s) 622 such as one or more displays, speakers, printers, and/or any other output device may also be included in device 612. Input device(s) 624 and output device(s) 622 may be connected to device 612 via a wired connection, wireless connection, or any combination thereof. In one embodiment, an input device or an output device from another computing device may be used as input device(s) 624 or output device(s) 622 for computing device 612.

Components of computing device 612 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 612 may be interconnected by a network. For example, memory 618 may be comprised of multiple physical memory units located in different physical locations interconnected by a network.

Those skilled in the art will realize that storage devices utilized to store computer readable instructions may be distributed across a network. For example, a computing device 630 accessible via a network 628 may store computer readable instructions to implement one or more embodiments provided herein. Computing device 612 may access computing device 630 and download a part or all of the computer readable instructions for execution. Alternatively, computing device 612 may download pieces of the computer readable instructions, as needed, or some instructions may be executed at computing device 612 and some at computing device 630.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for regulating power on a power grid, comprising:
   receiving, from a power utility entity, a request to increase power consumption by a datacenter, the request seeking assistance of the datacenter to reduce a supply of power available via the power grid;
   using the request to determine a desired increase in power consumption of the datacenter to reduce the supply of power available via the power grid; and
   upwardly adjusting an amount of power consumed by the datacenter from the power grid based at least in part upon the desired increase in power consumption to reduce the supply of power available via the power grid.

2. The method of claim 1, the request indicative of present power consumption on the power grid.

3. The method of claim 1, the request indicative of predicted future power consumption on the power grid.

4. The method of claim 1, comprising providing the power utility entity with information indicative of throttling capacity of the datacenter, the throttling capacity indicative of a minimum amount of power and a maximum amount of power that can be consumed by the datacenter at a given time.

5. The method of claim 1, the upwardly adjusting comprising increasing a workload of a first server of the datacenter.

6. The method of claim 1, the upwardly adjusting comprising creating a virtualized environment on a first server of the datacenter, the virtualized environment configured to execute power consumption code.

7. The method of claim 1, the upwardly adjusting comprising transferring load to the datacenter from a second datacenter.

8. The method of claim 1, the request indicative of the desired increase in power consumption.

9. The method of claim 4, the receiving comprising receiving the information responsive to the providing.

10. The method of claim 1, the upwardly adjusting comprising throttling up a portion of the datacenter comprising a non-critical load.

11. A power regulation system for regulating power on a power grid, comprising:
   a power monitor component configured to receive, from a power utility entity, a request to increase power consumption by a datacenter, the request seeking assistance of the datacenter to reduce a supply of power available via the power grid; and
   a power management component configured to:
      use the request to determine a desired increase in power consumption of the datacenter to reduce the supply of power available via the power grid; and
      upwardly adjust an amount of power consumed by the datacenter from the power grid based at least in part upon the desired increase in power consumption to reduce the supply of power available via the power grid.

12. The power regulation system of claim 11, the request indicative of present power consumption on the power grid.

13. The power regulation system of claim 11, comprising a datacenter communication component configured to provide the power utility entity with information indicative of future power demands of the datacenter.

14. The power regulation system of claim 11, the power management component configured to upwardly adjust the amount of power consumed by the datacenter by increasing a workload of a first server of the datacenter.

15. The power regulation system of claim 11, the power management component configured to upwardly adjust the amount of power consumed by the datacenter by creating a virtualized environment on a first server of the datacenter, the virtualized environment configured to execute power consumption code.

16. The power regulation system of claim 11, the power management component configured to upwardly adjust the amount of power consumed by the datacenter by transferring load to the datacenter from a second datacenter.

17. The power regulation system of claim 11, the request indicative of the desired increase in power consumption.

18. The power regulation system of claim 11, comprising a datacenter communication component configured to provide the power utility entity with information indicative of throttling capacity of the datacenter, the throttling capacity indicative of a minimum amount of power and a maximum amount of power that can be consumed by the datacenter at a given time.

19. The power regulation system of claim 11, the power management component configured to upwardly adjust the amount of power consumed by the datacenter by throttling up a portion of the datacenter comprising a non-critical load.

20. A computer readable medium comprising instructions that when executed perform a method, comprising:
   receiving, from a power utility entity, a request to increase power consumption by a datacenter, the request seeking assistance of the datacenter to reduce a supply of power available via a power grid;
   using the request to determine a desired increase in power consumption of the datacenter to reduce the supply of power available via the power grid; and
   upwardly adjusting an amount of power consumed by the datacenter from the power grid based at least in part upon the desired increase in power consumption to reduce the supply of power available via the power grid.

\* \* \* \* \*